United States Patent
Nottingham et al.

(10) Patent No.: US 6,672,766 B2
(45) Date of Patent: Jan. 6, 2004

(54) EASY-FILL, EASY-PRESS CONICAL BEARING

(75) Inventors: Robert A. Nottingham, Santa Cruz, CA (US); Jeffry A. LeBlanc, Aptos, CA (US); Troy M. Herndon, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1 day.

(21) Appl. No.: 09/896,007

(22) Filed: Jun. 28, 2001

(65) Prior Publication Data

US 2002/0113507 A1 Aug. 22, 2002

Related U.S. Application Data

(60) Provisional application No. 60/270,222, filed on Feb. 20, 2001.

(51) Int. Cl.[7] .............................................. F16C 32/06
(52) U.S. Cl. ...................................... 384/110; 384/132
(58) Field of Search .................................. 384/100, 110, 384/132

(56) References Cited

U.S. PATENT DOCUMENTS

| | | | | |
|---|---|---|---|---|
| 5,697,708 A | * | 12/1997 | Leuthold et al. ............. | 384/110 |
| 5,947,608 A | * | 9/1999 | Kim ............................ | 384/110 |
| 6,154,339 A | * | 11/2000 | Grantz et al. ................ | 384/110 |
| 6,280,088 B1 | * | 8/2001 | Leuthold et al. ............. | 384/110 |
| 6,322,252 B1 | * | 11/2001 | Grantz et al. ................ | 384/110 |

* cited by examiner

Primary Examiner—Thomas R. Hannon
(74) Attorney, Agent, or Firm—Moser, Patterson & Sheridan, LLP

(57) ABSTRACT

The cone which is pressed onto or otherwise affixed to the shaft to cooperate with the sleeve to form a conical hydrodynamic bearing is modified to provide a flat surface at the axially outer end of the cone most distant from the conical surface which is used to form the conical bearing in cooperation with the bearing seat of the sleeve and the intervening fluid. The sleeve surface facing the second angled surface of the bearing cone is modified to diverge more sharply away from the second surface of the cone, or to simply be spaced further away. In this way, a larger reservoir is formed, diminishing the possibility of oil evaporation and oil loss. Finally, a relatively flat shield is supported from the sleeve overlying the flat upper surface of the cone. The divergence of the upper bearing cone surface from the surrounding sleeve also allows for filling the bearing before the shield is installed. This solves the problem of trying to fill the bearing through a small hole either directly in the protective shield or between the protective shield and the outer diameter of the shaft. Not having the hole in the shield also lowers the likelihood of evaporation or splash loss of oil from the conical bearing.

20 Claims, 3 Drawing Sheets

EASY-FILL, EASY-PRESS CONICAL BEARING

CROSS-REFERENCE TO RELATED APPLICATIONS

This application claims benefit of United States provisional patent application serial No. 60/270,222, filed Feb. 20, 2001 by Robert A. Nottingham, Jeffry A. LeBlanc, and Troy M. Herndon and entitled "Easy-Fill, Easy-Press Conical", which is herein incorporated by reference.

FIELD OF THE INVENTION

The present invention relates to the field of hydrodynamic bearing assemblies, and more specifically, to a design which allows for easier assembly of the conical bearing as well as for easier filling of the bearing with fluid.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside a hub that supports the discs. One type of motor in common use is known as an in-hub or in-spindle motor. Such in-spindle motors typically have a spindle mounted by means of two ball or hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the spindle to rotate, thereby rotating the disc and passing the information storage tracks beneath the head.

The use of hydrodynamic bearing assemblies in such drive systems has become preferred due to desirable reductions in drive size and noise generation as compared to conventional ball bearing drive systems. In hydrodynamic bearings, a lubricating fluid, such as oil or air, functions as the bearing surface between a base or housing and a spindle or hub. As the lubricating fluids require small gaps between the stationary and rotating members in order to provide the support, stiffness and lubricity required for proper bearing operation, conventional drive components and assemblies typically require tight tolerances and demand precision assembly methods. Such demanding tolerance and assembly control results in increased part and assembly costs along with an increased level of quality control to ensure proper drive operation.

Thus the problem presented is to make hydrodynamic bearing and especially a conical bearing, which is easier to assemble and fill with bearing fluid.

Present day conical bearing design includes a sloping outer surface on the cone which is positioned on the shaft. This makes it quite difficult to accurately push the bearing cone onto the shaft and accurately locate it as the positioning tool must be pressed against a sloping surface. Current conical bearing design also makes the bearing hard to fill. The gap between the shield which must be placed over the top of the bearing cone and supported from the sleeve is very small. This makes it hard to insert a needle or the like to feed the bearing with oil. The alternative is to leave a small hole extending through the shield. However, this creates the related problem of having a hole through the shield which will remain open after the bearing has been filled with fluid. Thus it is always possible that impurities could find their way in through this hole, however small, and find their way into the fluid. Further, if instead an effort is made to insert oil between the end of the shield in the other diameter of the shaft, oil may get stuck between the shaft OD and the shield ID. Further, current design using a conical outer surface places the meniscus of the oil or fluid which fills the bearing quite close to the gap between shield and shaft, presenting the opportunity, especially if a shock occurs, for some oil to reach the shaft and migrate along the shaft out of the bearing.

Therefore, the problem presented is to develop and adopt a design to make such a conical bearing easier to assemble and less susceptible to fluid migration.

SUMMARY OF THE INVENTION

The present invention provides method and apparatus for easily assembling a conical bearing on a shaft.

The present invention further provides a modified shield plate overlying the conical bearing to make filling of the hydrodynamic bearing easier, and to diminish the likelihood of loss of fluid.

A further advantage of the invention is that by adopting the invention, the possibility of oil evaporation is lower, and any particles that exist in the fluid may be more easily collected outside the fluid bearing gap.

In summary, according to the present invention, the design of the cone which is pressed onto or otherwise affixed to the shaft to cooperate with the sleeve to form a conical hydrodynamic bearing is modified to provide a flat surface at the axially outer end of the cone most distant from the conical surface which is used to form the conical fluid bearing in cooperation with the sleeve and the intervening fluid.

Further, the sleeve surface facing the upper conical or angled surface of the bearing cone is modified to diverge more sharply away from the upper conical surface of the bearing cone, or to simply be spaced further away. In this way, a larger fluid reservoir is formed between the surface of the sleeve and the outer upper surface of the bearing cone, diminishing the possibility of oil evaporation and oil loss.

Finally, a relatively flat shield is supported from the sleeve overlying the flat upper surface of the cone, making this shield simpler to fabricate and install with the necessary tolerances relative to the cone which is imposed on the sleeve.

The use of a bearing cone having a secondary angular surface which cooperates with the surrounding sleeve to form a larger reservoir, and ends in a substantially flat axially distal surface allows the cone to be more easily pressed onto the shaft by presenting a surface that is normal or substantially normal to any pressing force imposed. This normal surface or substantially normal surface also makes it easier to set the axial height of the cone.

The divergence of the upper bearing cone surface from the surrounding sleeve also allows for filling the bearing before the shield is installed. This solves the problem of trying to fill the bearing through a small hole either directly in the protective shield or between the protective shield and the outer diameter of the shaft. Not having the hole in the shield also lowers the likelihood of evaporation or splash loss of fluid from the conical bearing.

Other features and advantages of the invention as well as manner in which the above described features and benefits of the present invention are attained can be understood by reference to the embodiment thereof, which is illustrated in the appended drawings. It is to be noted, however, that the drawings illustrate only an exemplary embodiment of the invention and are not considered limiting in its scope, for the invention may admit to other equally effective embodiments.

DETAILED DESCRIPTION OF THE PREFERRED EMBODIMENTS

To facilitate understanding, whenever possible, similar or identical reference numbers have been used to designate similar elements that are common to the figures.

Figure 1:
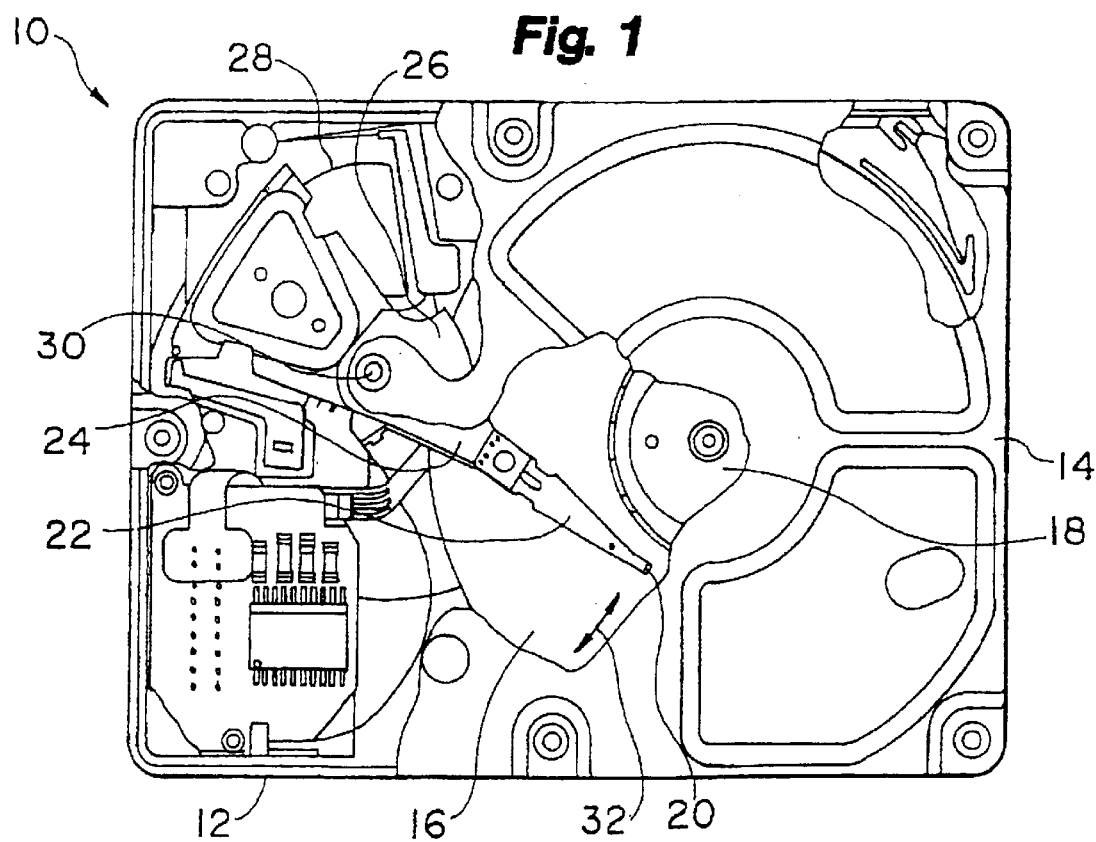
FIG. 1 is a top land view of a disc drive data storage device in which the present invention is useful.

The invention comprises a spindle motor for a disc drive data storage device. FIG. 1 is a plan view of a typical disc drive 10 wherein the invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing. For example, disc drives have been manufactured using a vertical split between two housing members. In such drives, that portion of the housing half that connects to the lower end of the spindle motor is analogous to base 12, while the opposite side of the same housing member, that is connected to or adjacent the top of the spindle motor, is functionally the same as the top cover 14.

Disc drive 10 further includes a disc pack 16 that is mounted for rotation on a spindle motor (not shown) by a disc clamp 18. Disc pack 16 includes one or more individual discs that are mounted for co-rotation about a central axis. Each disc surface has an associated head 20 that is mounted to disc drive 10 for communicating with the disc surface. In the example shown in FIG. 1, heads 20 are supported by flexures 22 that are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the invention is also useful in disc drives having other types of actuators, such as linear actuators.

Figure 2:
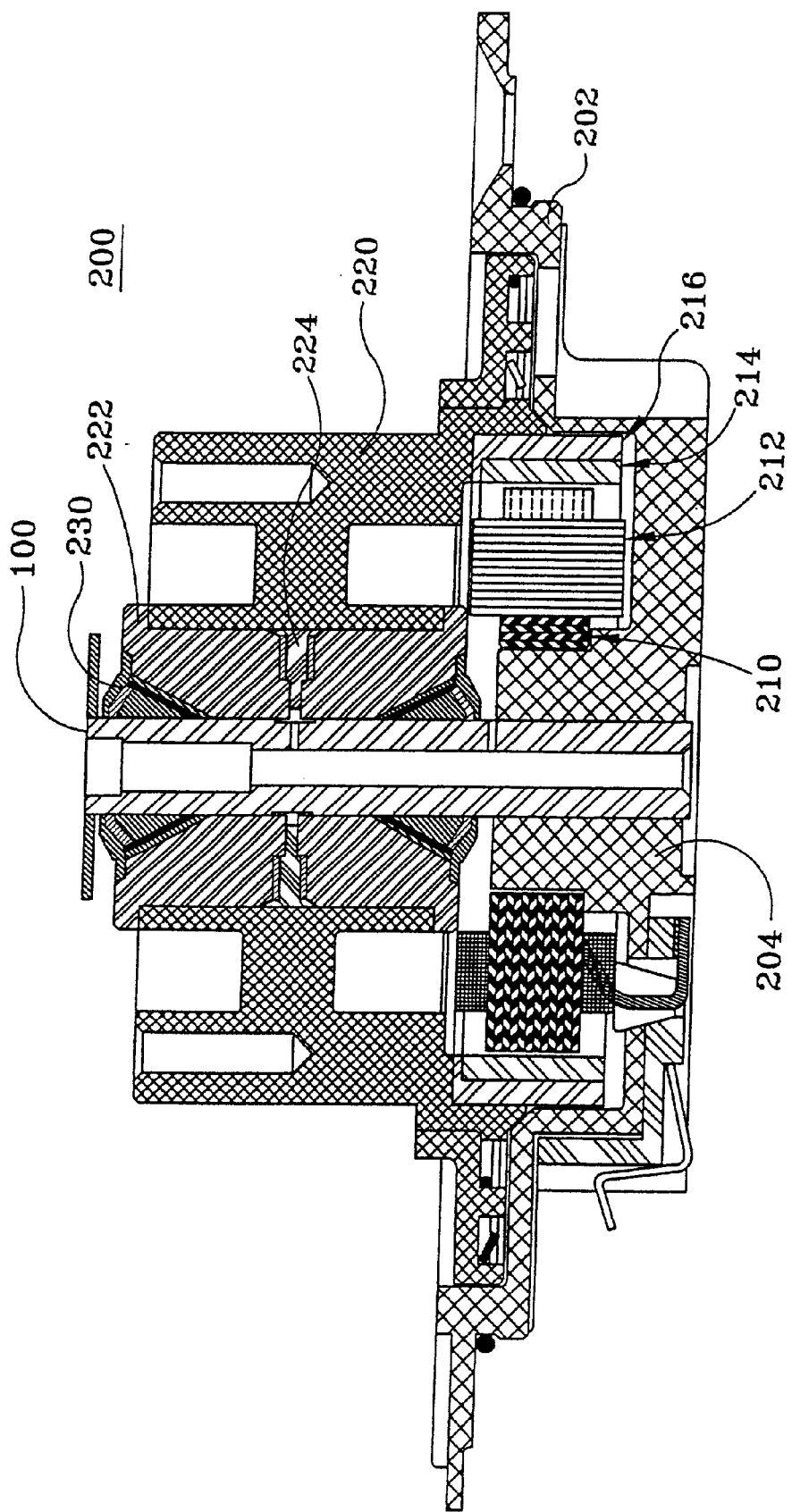
FIG. 2 is a vertical sectional view of a typical disc drive spindle motor in which the present invention is useful.

FIG. 2 is a vertical sectional view of a disc drive spindle motor in which the present invention is useful. However, it should be understood the present invention is useful with any disc drive motor design incorporating a conical bearing. FIG. 2 shows a spindle motor 200 supported from a base frame 202 with the shaft 100 being supported from shoulders 204 in the base frame 202. In this particular instance, a fixed shaft motor design is shown; however, obviously the principles and embodiments of the present invention are equally useful with a rotating shaft design having a fixed sleeve for support. The motor itself includes a laminated stack 210 supporting stator coils 212 adjacent a magnet 214 which is supported from a back iron 216. The magnet 214 and back iron 216 in turn are supported from a hub 220 which is supported from a sleeve 222 which rotates around the shaft 100. The hub 220 supports one or more discs (which are not shown in this view) for constant speed rotation as has been explained above with reference to FIG. 1. The sleeve 222 incorporates a rubber field expansion joint 224 in order to accommodate thermal variations which may occur during operation of the system. The sleeve 222 is supported for rotation around the shaft 100 at least in part by upper and lower conical bearings 230. The details of the existing cone design, as well as the modified cone design which is the subject matter of the present invention, are shown especially clear in FIGS. 3A and 3B.

Figure 3C:
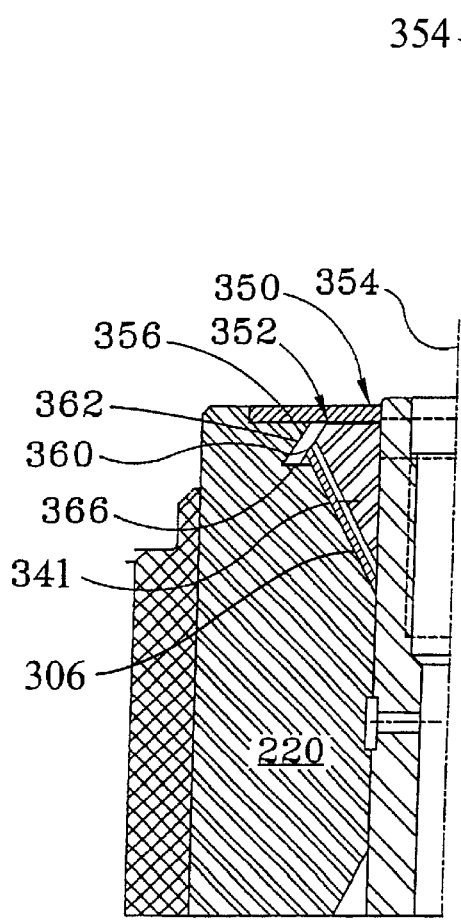
FIGS. 3B and 3C are vertical sectional views of embodiments of the present invention.
Figure 3A:
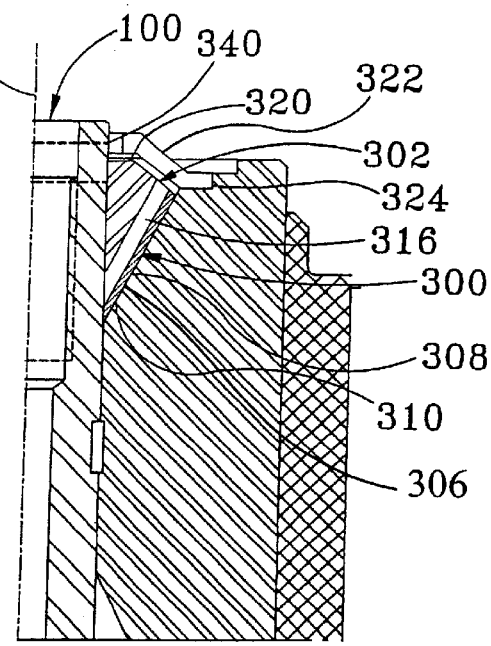
FIG. 3A is a vertical sectional view of a known conical bearing.

In summary, the current conical bearing 300 as shown in FIG. 3A comprises a cone 302 mounted on shaft 100. The gap 306 between the lower cone surface 308 and facing sleeve surface or bearing seat 310 is filled with fluid, and grooves are defined on one of the surfaces 308, 310 to maintain the fluid within this gap 306. The fluid circulates, or is maintained, in the path 316, and also resides in the gap between the upper angular cone surface 320 and the facing surface 322 of shield 324. The upper cone surface 320 and facing shield surface 322 diverge slightly as appears in the figure in order to form a meniscus at the boundary of the fluid so that fluid cannot escape through the gap 340 between the end of the shield 324 and the outer diameter of the shaft 100. The same gap 340 is used to fill the bearing with fluid by inserting a needle through the gap and then pressing the fluid in. However, this shield gap between the shield 324 ID and the shaft 100 OD is small, making it hard to fill the bearing with oil.

Figure 3B:
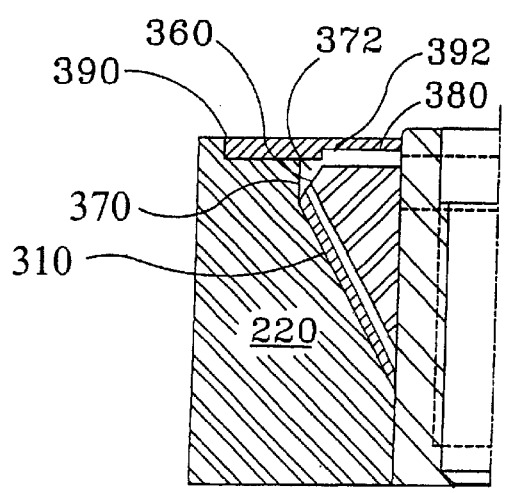

Referring therefore to the side of FIG. 3B, a new design is shown for the bearing cone 340 supported on the shaft which is adapted to allow for filling the bearing before the modified shield 350 is pressed into place. This modified bearing cone design includes a truncated, substantially flat, surface 352, which is substantially normal to the central axis 354 of the shaft 100. A small reservoir 356 is defined recessed into the surrounding sleeve 220 adjacent the outer end of the circulation path 316 and defined between upper angular surface 360 and sleeve surface 362. This reservoir will allow easy filling of the fluid dynamic bearing prior to pressing the shield 350 into place. It will further more easily maintain the fluid in the bearing, and have an upper meniscus or boundary between fluid and air, which is more distant from the junction between the inner diameter of the shield 350 and the outer diameter of the shaft 100. This will reduce the evaporation of the fluid in the bearing, and further substantially diminish the chances of fluid being splashed against the outer diameter or outer surface of the shaft 100 which could lead to migration of the fluid out of the bearing along the shaft. This would both diminish the supply of fluid in the bearing, and potentially cause contamination within the hard disk drive. This modified reservoir is defined between the upper angular surface 360 of the bearing cone and the inner surface of 362 of the sleeve 220. This inner surface of the sleeve is terminated at a point approximately equal to the upper end of the bearing cone surface 308 as well as the angular bearing seat surface 310 which cooperates therewith to define the hydrodynamic bearing region. As shown in FIG. 3A, at the upper end of the bearing seat surface region 310, the sleeve may be cut back to form a radial surface 366 to enlarge the area of the reservoir and enhance the fluid holding capacity of the system.

A further alternative of this design is shown in FIG. 3C wherein the inner surface 370 of sleeve 220 is substantially parallel to the shaft axis, and extends down to meet the upper end of the sleeve bearing seat surface 310. The angled upper surface 360 of the cone extends down toward the sleeve inner surface 370 to form the reservoir 372 which will be filled up beyond the exit of the circulation path 324 and end in a meniscus which separates the fluid from the air. This maintains proper fluid stability and circulation and availability in the fluid dynamic bearing, while minimizing the potential for fluid evaporation or loss.

As with the previous embodiment, the upper conical surface 360 of cone 340 ends in a normal surface 380, which extends from the upper angled surface 360 to the outer diameter surface of the shaft 100. When pressing the cone onto the shaft 100, this new design provides a surface 380 which is normal to the pressing force imposed. This makes it very easy to properly press the cone onto the shaft as well as to properly set the axial height of the cone or spacing of the cone relative to the sleeve's cooperating surface 310.

In summary, the designs of FIGS. 3B and 3C both provide a flat normal surface for pressing the cone onto the shaft. They both provide for an easily assembly and oil-filling process. Namely, after the sleeve is put in place, and the shaft extended through the sleeve, then the cone can be slid into place by pressing it along the surface of the shaft. After the proper gap 306 is established between the facing surfaces 306 and 308 of the conical fluid dynamic bearing, then oil or fluid can be easily inserted into the fluid bearing. It is only after the fluid bearing has been filled as well as the reservoir 372, that the shield 390 needs to be installed. It should be noted that the shield 390 is a substantially flat single piece, although it may have a slight axially offset section 392 in order to create a secondary meniscus or capillary seal to further diminish the possibility of fluid loss from the bearing.

Another advantage of the invention is that the fluid evaporation is diminished because there is no need for a filling hole extended through the shield, and the only opening between the inner diameter of the shield 390 and the outer diameter of the shaft 100, is distant from the meniscus of the fluid in the reservoir 372. This design further makes use of a relatively conventional single plate capillary seal to close off the end of the fluid bearing. The design further provides for simplified cone manufacturing, while maintaining this previously well-established conical bearing surface 306 and circulation groove path or opening 324.

Other features and advantages of this invention will be apparent to a person of skill in the art who studies this invention disclosure. Therefore, the scope of the invention is to be limited only by the following claims.

What is claimed is:

1. A conical hydrodynamic bearing comprising a shaft and a sleeve mounted for rotation around said shaft, the sleeve being supported for rotation relative to the shaft at least in part by the conical bearing comprising a cone fixed to the shaft and having a first angular surface co-operating with a bearing seat surface of the sleeve across a gap filled with a fluid, at least one of the angular bearing surfaces having a plurality of grooves thereon, the bearing cone comprising a secondary angled surface extending from an end of the conical bearing surface toward an axial end of the cone, and ending in surface substantially normal to the axis of the shaft, whereby the cone may be easily pressed in place and located on the shaft.

2. A hydrodynamic bearing as claimed in claim 1 wherein the cone includes a fluid circulation return path extending through the cone and terminating at the secondary angled surface of the cone, the fluid being maintained in the reservoir to cover the exit opening of the return path so that the fluid is maintained between the first surface of the cone and the facing bearing seat surface of the sleeve.

3. A hydrodynamic bearing as claimed in claim 2 wherein the reservoir defined by the surface of the sleeve facing the secondary angled surface of the cone, the surface of the sleeve extending substantially perpendicular to the normal surface by which the cone terminates, the reservoir extending to an end of the conical bearing.

4. The hydrodynamic bearing of claim 1 wherein the second angular surface of the cone is spaced from an inner surface wall of the sleeve to define a reservoir adjacent to an end of the fluid filled conical bearing.

5. A hydrodynamic bearing as claimed in claim 4 further comprising a substantially flat shield extending from an upper surface of the sleeve across the normal surface of the cone.

6. A hydrodynamic bearing as claimed in claim 5 wherein the shield includes a slightly offset portion extending partially across the normal surface of the cone to provide a spacing between the normal surface of the cone and the interior surface of the shield to diminish the possibility of fluid escaping from the hydrodynamic bearing between the shield and the cone normal surface.

7. A hydrodynamic bearing as claimed in claim 4 wherein an interior surface of the sleeve faces the secondary angled surface of the cone and is spaced therefrom to form a fluid reservoir extending axially to an upper axial end of the fluid bearing.

8. A hydrodynamic bearing as claimed in claim 7 wherein the interior surface of the sleeve is spaced from the second angular surface of the cone by a surface extending axially from the bearing seat so that a larger reservoir capable of collecting particles in the fluid is defined.

9. A hydrodynamic bearing as claimed in claim 8 further comprising a substantially flat shield extending from an upper surface of the sleeve across the normal surface of the cone.

10. A spindle motor for use in a disc drive comprising a shaft and a sleeve supported for relative rotation, the sleeve supporting a hub and one or more discs thereon, the sleeve being supported by a conical bearing comprising a cone fixed to the shaft and having a first angular surface co-operating with a bearing seat surface of the sleeve across a gap filled with a fluid, at least one of the angular bearing surfaces having a plurality of grooves thereon, the bearing cone comprising a secondary angled surface extending from an end of the conical bearing surface toward an axial end of the cone, and ending in surface substantially normal to the axis of the shaft, whereby the cone may be easily pressed in place and located on the shaft.

11. The spindle motor of claim 10 wherein the second angular surface of the cone is spaced from an inner surface wall of the sleeve to define a reservoir adjacent to an end of the fluid filled conical bearing.

12. The spindle motor as claimed in claim 11 wherein the cone includes a fluid circulation return path extending through the cone and terminating at the secondary angled surface of the cone, the fluid being maintained in the reservoir to cover the exit opening of the return path so that the fluid is maintained between the first surface of the cone and the facing bearing seat surface of the sleeve.

13. The spindle motor as claimed in claim 12 wherein the reservoir defined by the surface of the sleeve facing the secondary angled surface of the cone, the surface of the sleeve extending substantially perpendicular to the normal surface by which the cone terminates, the reservoir extending to an end of the conical bearing.

14. The spindle motor as claimed in claim 13 further comprising a substantially flat shield extending from an upper surface of the sleeve across the normal surface of the cone.

15. The spindle motor as claimed in claim 4 wherein an interior surface of the sleeve faces the secondary angled surface of the cone and is spaced therefrom to form a fluid reservoir extending axially to an upper axial end of the fluid bearing.

16. The spindle motor as claimed in claim 15 wherein the cone includes a fluid circulation return path extending through the cone and terminating at the secondary angled surface of the cone, the fluid being maintained in the reservoir to cover the exit opening of the return path so that the fluid is maintained between the first surface of the cone and the facing bearing seat surface of the sleeve.

17. The spindle motor as claimed in claim 14 wherein the shield includes a slightly offset portion extending partially across the normal surface of the cone to provide a spacing between the normal surface of the cone and the interior surface of the shield to diminish the possibility of fluid escaping from the hydrodynamic bearing between the shield and the cone normal surface.

18. The spindle motor as claimed in claim 10 wherein the interior surface of the sleeve is spaced from the second angular surface of the cone by a surface extending axially from the bearing seat so that a larger reservoir capable of collecting particles in the fluid is defined.

19. A spindle motor for use in a disc drive comprising a shaft and a sleeve supported for relative rotation, the sleeve supporting a hub and one or more discs thereon, the sleeve being supported by the conical bearing comprising a cone fixed to the shaft and having a first angular surface co-operating with a bearing seat surface of the sleeve across a gap filled with a fluid, at least one of the angular bearing surfaces having a plurality of grooves thereon, the bearing cone comprising a secondary angled surface extending from an end of the conical bearing surface toward an axial end of the cone, and means included in said cone adjacent said secondary angled surface whereby the cone may be readily located on the shaft.

20. A spindle motor as claimed in claim 19 wherein the sleeve comprises means for defining an easily filled axially oriented reservoir.

* * * * *